(12) United States Patent
Carone et al.

(10) Patent No.: US 11,136,957 B1
(45) Date of Patent: Oct. 5, 2021

(54) RAIN GUTTER POWER GENERATOR

(71) Applicant: Alarm.com Incorporated, Tysons, VA (US)

(72) Inventors: Johnathan Michael Carone, McLean, VA (US); Donald Faraci, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/912,165

(22) Filed: Jun. 25, 2020

Related U.S. Application Data

(60) Provisional application No. 62/868,131, filed on Jun. 28, 2019.

(51) Int. Cl.
*F03B 13/00* (2006.01)
*E04D 13/08* (2006.01)

(52) U.S. Cl.
CPC ............ *F03B 13/00* (2013.01); *E04D 13/08* (2013.01); *E04D 2013/0806* (2013.01); *F05B 2220/20* (2013.01); *F05B 2240/9112* (2013.01)

(58) Field of Classification Search
CPC . F03B 13/00; E04D 13/08; E04D 2013/0806; F05B 2240/9112; F05B 2220/20
See application file for complete search history.

(56) References Cited

U.S. PATENT DOCUMENTS

| | | | |
|---|---|---|---|
| 7,469,541 B1 | 12/2008 | Melton et al. | |
| 2009/0097961 A1* | 4/2009 | Nightingale | ............ E04D 13/08 415/24 |
| 2014/0327247 A1* | 11/2014 | Calabro | .................... F03D 9/11 290/4 C |

\* cited by examiner

*Primary Examiner* — Tulsidas C Patel
*Assistant Examiner* — S. Mikailoff
(74) *Attorney, Agent, or Firm* — Fish & Richardson P.C.

(57) ABSTRACT

A system includes a rain gutter of a property, wherein at least a portion of the rain gutter is positioned on a roof of the property, a rain gutter power generator that is coupled to the rain gutter, and a control unit that controls the device at the property. The rain gutter power generator includes a water turbine that transforms kinetic energy of water collected by the rain gutter of the property into mechanical energy and an electromagnet that transforms the mechanical energy into electricity that powers a device at the property.

11 Claims, 3 Drawing Sheets

123# RAIN GUTTER POWER GENERATOR

CROSS-REFERENCE TO RELATED APPLICATIONS

This application claims the benefit of U.S. Provisional Application No. 62/868,131, filed Jun. 28, 2019, which is incorporated by reference in its entirety.

TECHNICAL FIELD

This disclosure relates to powering devices within a property.

BACKGROUND

Many homes have devices that consume power. For example, homes may have thermostats that monitor temperature, security cameras that capture video from within the home, and light bulbs that emit light.

SUMMARY

Techniques are described for rain gutter based power generation.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
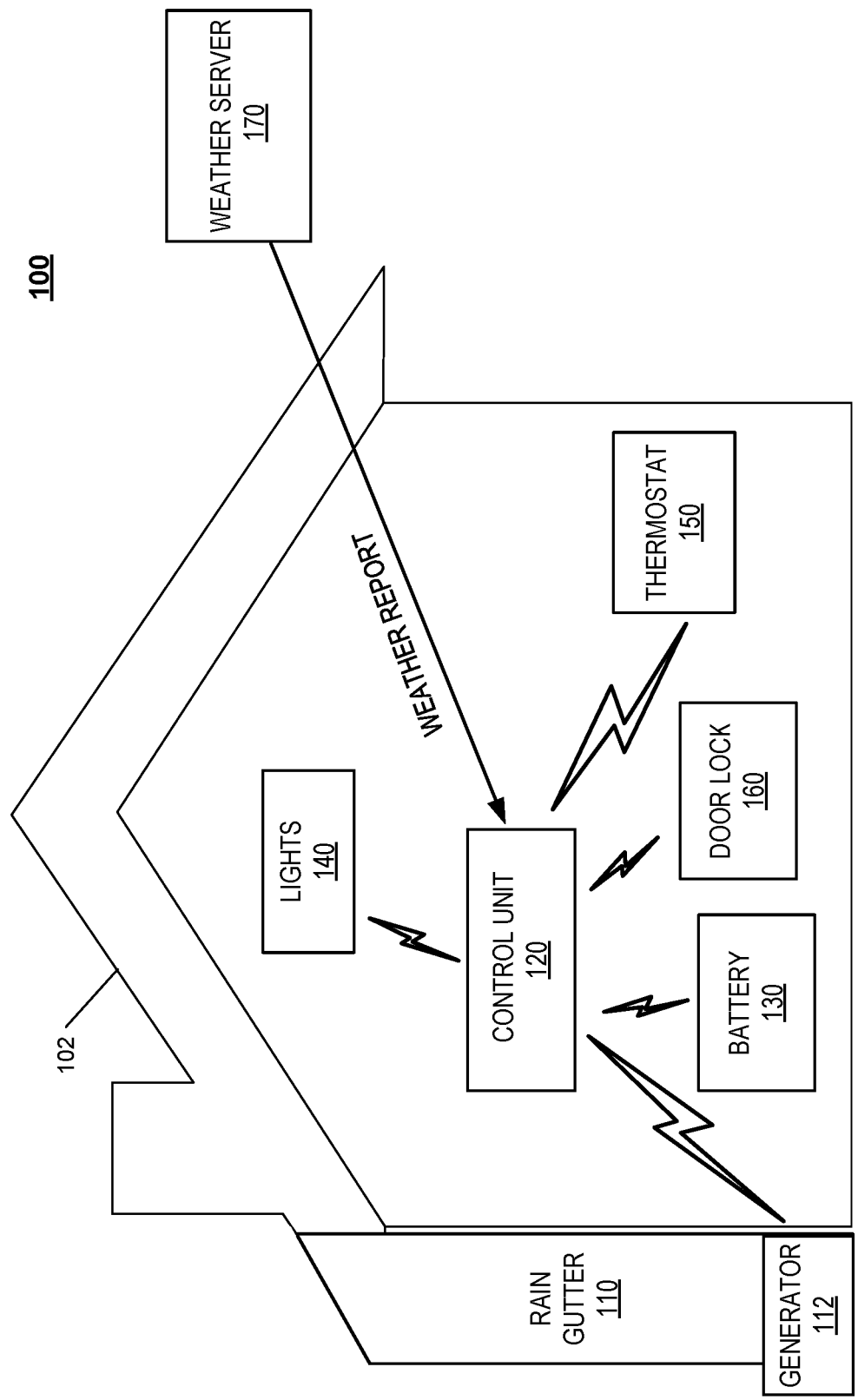
FIG. 1 illustrates an example of a system for rain gutter based power generation.

FIG. 1 illustrates an example of a system 100 for rain gutter based power generation. Power outages to properties frequently happen during bad storms and these storms may be used with rain gutter based power generation to power properties. The system 100 includes a property 102, a rain gutter 110, a rain gutter power generator 112 (also referred to as generator 112), a control unit 120, a battery 130, lights 140, a thermostat 150, a door lock 160, and a weather server 170.

The rain gutter 110 may be a physical structure that collects water that flows down a roof of a building of the property 102 and directs the water away from the building. For example, the rain gutter 110 may include a half pipe-shaped portion that is substantially parallel to the ground and collects rain that runs down the roof of the building, and the half pipe-shaped portion may form a hole that leads to a downpipe portion that is substantially perpendicular to the ground. Water may collect in the half pipe-shaped portion on a roof, flow into the downpipe portion, fall to the ground, and be directed away from the building.

The generator 112 may be a physical structure that generates power from water collected by the rain gutter 110. The generator 112 may be coupled to the rain gutter such that the water that flows through the rain gutter 110 also flows through the generator 112 to generate power. For example, the generator 112 may be coupled to the bottom of the downpipe of the rain gutter 110 such that water that falls from the roof of the building builds kinetic energy that is then used by the generator 112 to generate power. In another example, the generator 112 may be configured to be placed inside the rain gutter 110 so that water flowing horizontally in the half pipe-shaped portion towards the downpipe generates power.

The generator 112 may include a water turbine that transforms kinetic energy of the water collected by the rain gutter 110 into mechanical energy, and may include an electromagnetic that transforms the mechanical energy into electricity. For example, a water turbine in the generator 112 may be spun by a flow of water from the rain gutter falling through the downpipe portion onto the turbine, an electromagnet may be connected to the turbine and spun when the turbine spins, and electricity may be generated by the electromagnet.

The control unit 120 may be electrically coupled to the generator 112 such that the control unit 120 receives electricity generated by the generator 112. For example, the generator 112 and the control unit 120 may be physically connected to a conductive wire that is also physically connected to the generator 112. The control unit 120 may be electrically coupled to the battery such that the control unit 120 receives power stored in the battery. For example, the generator 112 and the control unit 120 may be physically connected to a conductive wire that is also physically connected to the generator 112. In another example, the generator 112 may be electrically coupled to the generator 112 or other devices that are powered from the generator 112 through wireless charging.

Additionally, the control unit 120 may be electrically coupled to the lights 140, door lock 160, and thermostat 150 such that the control unit 120 may provide power to the lights 140, door lock 160, and thermostat 150. For example, the control unit 120 may route power from the generator 112 and the battery 130 to the lights 140.

The control unit 120 may also receive a weather report from a weather server 170. For example, the control unit 120 may receive a weather report that indicates that half an inch of rain is forecasted to fall in the next few hours where the property 102 is located. The control unit 120 may use the weather report to determine how much power the generator 112 may generate during a time frame that corresponds to the weather report. For example, the control unit 120 may determine that the weather report indicates half an inch of rain may fall during the next few hours and, in response, determine that the generator 112 may generate fifty Joules of power per second during the next few hours. In another example, the control unit 120 may determine that the weather report indicates a quarter of an inch of rain may fall during the next few hours and, in response, determine that the generator 112 may generate twenty five Joules of power per second during the next few hours. As discussed above, as the generator 112 generates power based on the kinetic energy of water collected by the rain gutter 110, the more rain that the weather report indicates is forecasted, the more power that the generator 112 is likely to generate.

In some implementations, the control unit 120 and devices within the home, e.g., the lights 140, thermostat 150, door lock 160, may be typically powered by electricity from a power station that is remote to the property 102. For example, the various devices may be powered from electricity through a power meter that is connected to a power line that is coupled to a power plant. However, in some instances power from the power station may become temporarily unavailable. For example, during inclement weather a tree may fall across a power line and that may prevent the property 102 from receiving power from the power plant. The control unit 120 may determine that power is no longer available from the power station and, in response, manage power usage in the property 102 based on the weather report.

When the control unit 120 determines that power is no longer available, the control unit 120 may select a set of devices to power in a property 102 based on the amount of rain indicated by the weather report and the amount of power available from the battery 130. For example, the control unit 120 may determine that a large amount of rain is forecasted and a large amount of power is available from the battery 130 and, in response, select to power all devices within the property 102 as all the devices may be able to be powered for many hours. In another example, the control unit 120 may determine that there is a small amount of rain forecasted and a small amount of power available from the battery 130 and, in response, select to power the lights 140 and the door lock within the property 102 so that the lights 140 and the door lock 160 may be powered as long as possible.

In some implementations, while power is no longer available, the control unit 120 may re-reselect a set of devices to power in the property 102. For example, the control unit 120 may re-select a set of devices each time the control unit 120 determines that a most recently received weather report is different than the previous most recently received weather report. In another example, the control unit 120 may re-select a set of devices every five, ten, thirty, or some other predetermined number of minutes elapses.

In some implementations, selecting the devices to power the control unit 120 may determine the amount of power consumed by each of the devices, the importance of each of the devices, the amount of power estimated to be generated by the generator 112 based on the weather report, and the amount of power available from the battery 130. For example, the control unit 120 may target to provide power to the selected devices for as long as rain is forecasted to fall and, in response, determine when the rain is forecasted to end and select the most important devices that can be powered for that amount of time based on the power available from the battery 130 and the power estimated to be generated by the generator 112.

In some implementations, the importance of devices may be predetermined. For example, the control unit 120 may store data that indicates that powering the door lock 160 has higher priority than powering the lights 140, and powering the lights 140 has higher priority than powering the thermostat 150. In some implementations, the importance may have been previously specified by a user.

In some implementations, the control unit 120 may consider the current amount of power being generated by the generator 112 in determining the amount of power estimated to be generated by the generator 112. For example, the control unit 120 may determine that the generator 112 is currently generating thirty Joules per second and that the amount of rain is forecasted to double during the next hour from the amount of rain forecasted for the current time, and, in response, determine that the generator is likely to generate sixty Joules per second during the next hour. In another example, the control unit 120 may determine that the generator 112 is currently generating thirty Joules per second and that the amount of rain is forecasted to half during the next hour, and, in response, determine that the generator is likely to generate thirty Joules per second during the next hour.

In some implementations, the control unit 120 may additionally or alternatively determine the amount of power estimated to be generated by the generator 112 based on historical data. For example, the control unit 120 may determine that the generator 112 was producing thirty Joules per second and the rate was constantly increasing during sixty seconds until thirty five Joules per second was being produced and, in response, the control unit 120 may determine that a rain storm is becoming more intense and that even more power is likely to be generated by the generator 112. Similarly, the control unit 120 may determine that the amount of power generated by the generator 112 has been steadily decreasing during the last minute and, in response, determine that the rain storm is becoming less intense and that less power per second is likely to be generated during the next couple minutes.

While the system 100 is shown as managing power to the lights 140, the thermostat 150, and the door lock 160, the system 100 may manage power to additional or fewer devices. For example, the system 100 may additionally include window sensors and cameras that the control unit 120 may determine how to power. In another example, the system 100 may not include a door lock 160.

In some implementations, the system 100 may include multiple generators. For example, the system 100 may include a first generator at the bottom of the rain gutter, a second generator in the downpipe near a midpoint between the ground and ceiling of the building, and a third generator near a top of the downpipe. Accordingly, the control unit 120 may similarly estimate the total amount of power to be generated by all of the generators and use the total amount of power to select the devices to power.

In some implementations, the system 100 may include a reservoir on a roof that collects water that falls and slowly releases the water into the rain gutter 110 so that the generator 112 can continuously generate power even after the rain stops. The reservoir may include a water sensor that indicates to the control unit 120 how much water is remaining in the reservoir, and the control unit 120 may estimate how much power that the generator 112 may still generate from water in the reservoir based on the amount of water indicated by the water sensor.

In some implementations, the system 100 may not include a battery 130 and the control unit 120 and selected devices may be entirely powered by the generator 112 when power from a power station is not available. Additionally, in some implementations, the system 100 may determine to start using power from the generator 112 even while power is available from the power station. For example, the system 100 may determine that a weather report indicates that extremely inclement weather is expected to continue, determine that a power failure is likely, and, in response, select a set of devices to be powered by the generator 112 while power is still available from the power station so that if power is lost from the power station, power to the set of devices is not interrupted as power would be continued to be provided by the generator 112.

Additionally or alternatively, in some implementations the control unit 120 may determine whether the rain gutter 110 is likely to be blocked based on the amount of power generated by the generator 112 and the weather report. For example, rain gutters may become blocked by leaves and other debris so that water no longer properly flows through the rain gutter and then away from the property 102, and instead flows down the walls of a building on the property. The control unit 120 may determine that the rain gutter 110 is likely blocked based on seeing that the amount of power generated by the generator 112 is less than an expected amount of power to be generated by the generator 112 based on the weather report. For example, the control unit 120 may determine that for the same amount of rain indicated by a weather report, that the generator 112 is generating only 10% of the power that the generator 112 was generating a month ago and, in response, provide an indication to a user that the rain gutter is likely to be blocked.

Additionally or alternatively, the control unit 120 may also use the presence of power generated by the generator 112 as an indication that rain is falling at the property 102. For example, the control unit 120 may determine that the generator 112 is not generating power and, in response, determine that rain is not falling at the property. In another example, the control unit 120 may determine that the generator 112 is generating power and, in response, determine that rain is falling at the property. In some implementations, the control unit 120 may perform certain actions based on determining that water is falling at the property. For example, the control unit 120 may automatically turn on (and potentially power) exterior lights to make it easier to see during a storm. The lights could be turned on/off at random intervals to make it look like someone is home even though the power is out.

In some implementations, the system 100 may include an image sensor that may capture images of the rain gutter 110 so that the system 100 may determine from the images whether there is debris in the rain gutter 110 that needs to be cleaned. The image sensor may additionally be used to determine whether there is a problem with the roof, e.g., shingles damaged in a storm that need to be replaced. The system 100 may provide users notifications that correspond to any problem that is identified.

Figure 2:
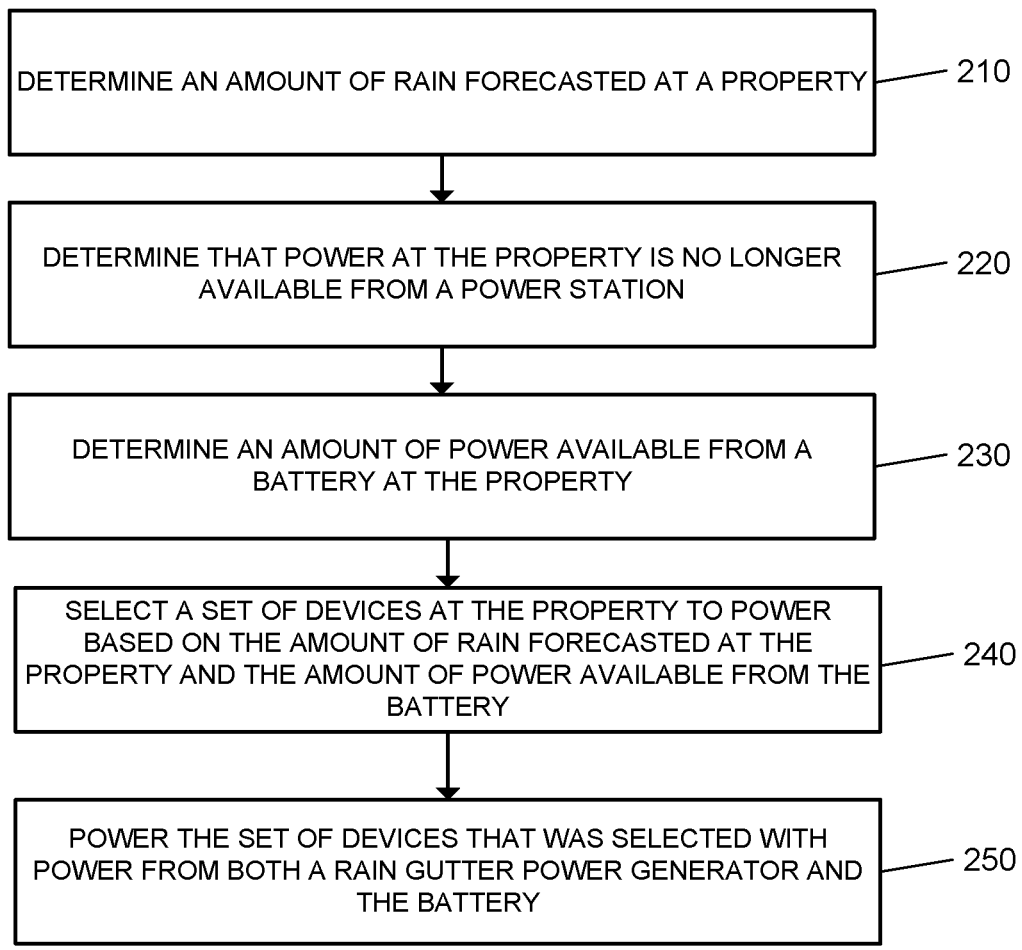
FIG. 2 is a flow chart of an example process for rain gutter based power generation.

FIG. 2 illustrates an example process 200 for rain gutter based power generation. Process 200 can be implemented using system 100 described above. Thus, descriptions of process 200 may reference one or more of the above-mentioned components, modules, or computational devices of system 100. In some implementations, described actions of process 200 are enabled by computing logic or software instructions executable by a processor and memory of an example electronic device. For example, the process 200 may be performed by the control unit 120.

The process 200 includes determining an amount of rain forecasted at a property (210). For example, the control unit 120 may determine that five inches of rain is forecasted at the property 102. In some implementations, determining an amount of rain forecasted at a property includes receiving a weather report from a weather server and determining the amount of rain forecasted at the property from the weather report. For example, the control unit 120 may receive a weather report from the weather server 170 and determine the amount of rain forecasted at the property based on the amount of rain that the weather report indicates will fall at a zip code that the property is located within.

The process 200 includes determining that power at the property is no longer available from a power station (220). For example, the control unit 120 may determine that a power meter is longer providing power to the property. In another example, the control unit 120 may determine that power from an electrical wire attached to the control unit 120 is no longer providing power.

The process 200 includes determining an amount of power available from a battery at the property (230). For example, the control unit 120 may receive a status from the battery 130 that indicates that ten kilowatt-hours of power are available from the battery 130.

The process 200 includes selecting a set of devices at the property to power based on the amount of rain forecasted at the property and the amount of power available from the battery (240). For example, the control unit 120 may determine to power the door lock 160 and the lights 140 based on the determination that five inches of rain are forecasted at the property 102 and ten kilowatt-hours of power are available from the battery. In some implementations, selecting a set of devices at the property to power based on the amount of rain forecasted at the property and the amount of power available from the battery includes determining an amount of power the rain gutter power generator is likely to generate based on the amount of rain forecasted at the property and selecting the set of devices at the property to power based on the amount of power the rain gutter power generator is likely to generate and the amount of power available from the battery. For example, the control unit 120 may determine that the rain gutter power generator is likely to generate one hundred Joules per second during the next hour and the ten kilowatt-hours of power are available from the battery and, in response, determine to power the door lock 160, the lights 140, and also the thermostat 150.

In some implementations, determining an amount of power the rain gutter power generator is likely to generate based on the amount of rain forecasted at the property includes determining an amount of power the rain gutter power generator is likely to generate based on historical data regarding power generated by the rain gutter power generator. For example, the control unit 120 may determine that the generator 112 was producing thirty Joules per second and the rate was constantly increasing during the past two minutes until thirty five Joules per second was being produced and, in response, the control unit 120 may determine that a rain storm is becoming more intense and that even more power is likely to be generated by the generator 112. Similarly, the control unit 120 may determine that the amount of power generated by the generator 112 has been steadily decreasing during the last five minutes and, in response, determine that the rain storm is becoming less intense and that less power per second is likely to be generated during the next couple minutes.

In some implementations, selecting a set of devices at the property to power based on the amount of rain forecasted at the property and the amount of power available from the battery includes selecting the set of devices at the property to power based on the amount of rain forecasted at the property, the amount of power available from the battery, and an amount of water in a water reservoir on the roof of the property that collects the water and controls a flow of the water into the rain gutter. For example, a reservoir on a roof may collect rain and slowly release water from the rain into the rain gutter 110 so that the generator 112 can continuously generate power even after the rain stops. The reservoir may include a water sensor that indicates to the control unit 120 how much water is remaining in the reservoir, and the control unit 120 may estimate how much power that the generator 112 may still generate from water in the reservoir based on the amount of water indicated by the water sensor.

The process 200 includes powering the set of devices that was selected with power from both a rain gutter power generator and the battery (250). For example, the control unit 120 may route power from the generator 112 and the battery 130 to the door lock 160 and the lights 140, and not to the thermostat 150.

In some implementations, the process 200 includes receiving a second weather report from the weather server and selecting a second set of devices at the property to power based on an amount of rain indicated in the second weather report and the amount of power available from the battery. For example, the control unit 120 may later receive another weather report that indicates that the rainfall will increase, in response, determine the generator 112 will likely generate more power, and, in response, select more devices to power.

In some implementations, the process 200 includes determining that the rain gutter is likely blocked based on the amount of rain forecasted at the property and an amount of power generated by the rain gutter power generator and providing an indication to a user that the rain gutter is likely to be blocked. For example, the control unit 120 may determine that for the same amount of rain indicated by a weather report, that the generator 112 is generating only 10% of the power that the generator 112 was generating a month ago and, in response, show, in a graphical user interface, an alert that states the rain gutter is likely to be blocked.

Figure 3:
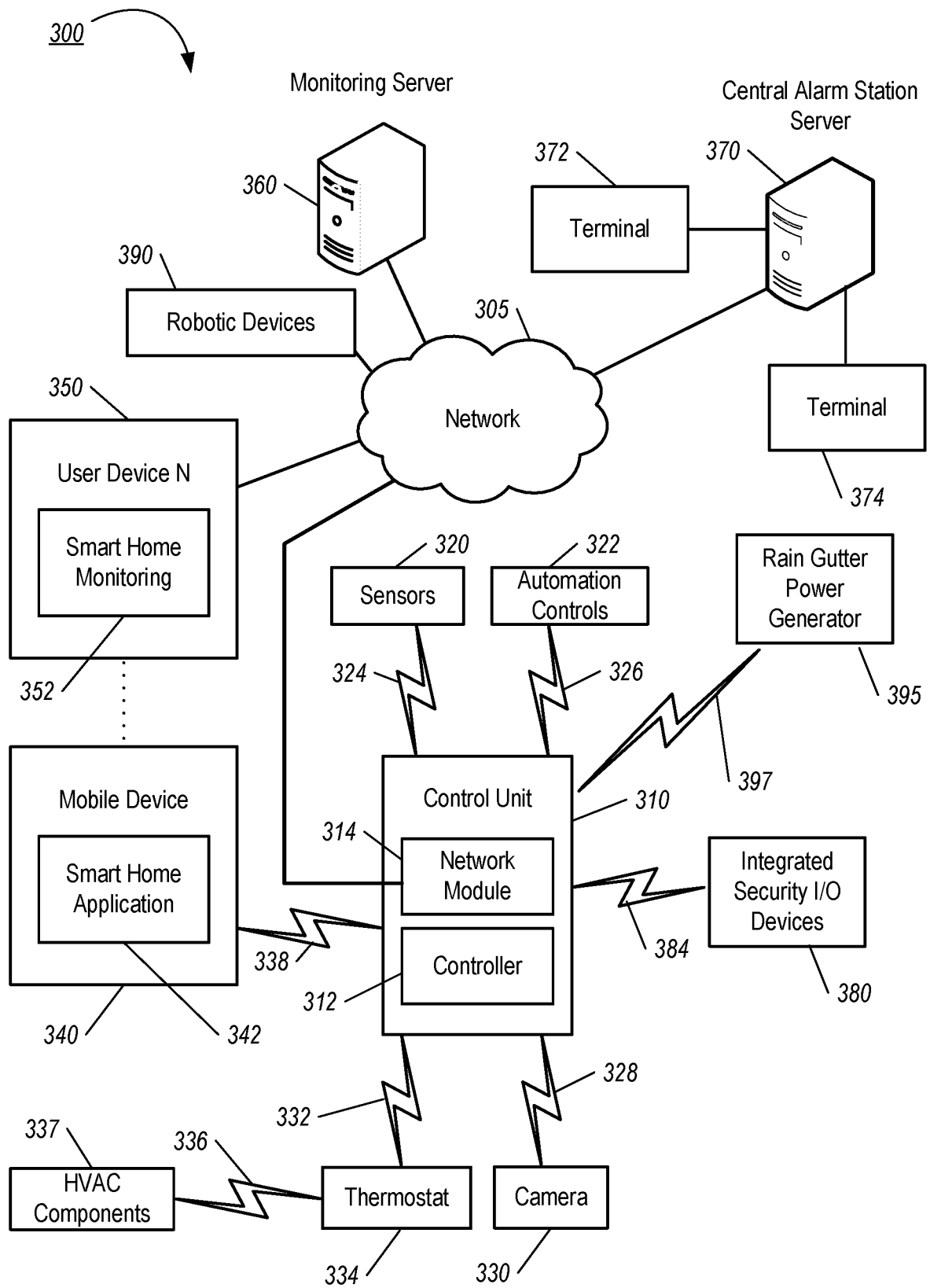
FIG. 3 illustrates another example of a monitoring system that provides rain gutter based power generation.

FIG. 3 is a diagram illustrating an example of a home monitoring system 300. The monitoring system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. In addition, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 390 may be devices that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid-state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

In addition, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 324, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events generated by the control unit 310. In this example, the monitoring server 360 may exchange electronic communications with the network module 314 included in the control unit 310 to receive information regarding events detected by the control unit 310. The monitoring server 360 also may receive information regarding events from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system and perform analysis of sensor and image data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the controls 322, possibly through the control unit 310.

The monitoring server 360 can be configured to provide information (e.g., activity patterns) related to one or more residents of the home monitored by the system 300 (e.g., user 108). For example, one or more of the sensors 320, the home automation controls 322, the camera 330, the thermostat 334, and the integrated security devices 380 can collect data related to a resident including location information (e.g., if the resident is home or is not home) and provide location information to the thermostat 334.

The central alarm station server 370 is an electronic device configured to provide alarm monitoring service by exchanging communications with the control unit 310, the one or more user devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more user devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the home monitoring application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a home monitoring application 352. The home monitoring application 342 refers to a software/firmware program running on the corresponding mobile device that enables the user interface and features described throughout. The user device 340 may load or install the home monitoring application 342 based on data received over a network or data received from local media. The home monitoring application 342 runs on mobile devices platforms, such as iPhone, iPod touch, Blackberry, Google Android, Windows Mobile, etc. The home monitoring application 342 enables the user device 340 to receive and process image and sensor data from the monitoring system.

The user device 340 may be a general-purpose computer (e.g., a desktop personal computer, a workstation, or a laptop computer) that is configured to communicate with the monitoring server 360 and/or the control unit 310 over the network 305. The user device 340 may be configured to display a smart home user interface 352 that is generated by the user device 340 or generated by the monitoring server 360. For example, the user device 340 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, and the robotic devices 390. The one or more user devices 340 and 350 receive data directly from the sensors 320, the home automation controls 322, the camera 330, and the robotic devices 390, and sends data directly to the sensors 320, the home automation controls 322, the camera 330, and the robotic devices 390. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, and the robotic devices 390, and are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, and the robotic devices 390 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, and the robotic devices 390 to a pathway over network 305 when the one or more user devices 340 and 350 are farther from the sensors 320, the home automation controls 322, the camera 330, the thermostat 334, and the robotic devices 390.

In some examples, the system leverages GPS information from the one or more user devices 340 and 350 to determine whether the one or more user devices 340 and 350 are close enough to the sensors 320, the home automation controls 322, the camera 330, the thermostat 334, and the robotic devices 390 to use the direct local pathway or whether the one or more user devices 340 and 350 are far enough from the sensors 320, the home automation controls 322, the camera 330, the thermostat 334, and the robotic devices 390 that the pathway over network 305 is required.

In other examples, the system leverages status communications (e.g., pinging) between the one or more user devices 340 and 350 and the sensors 320, the home automation controls 322, the camera 330, the thermostat 334, and the robotic devices 390 to determine whether communication using the direct local pathway is possible. If communication using the direct local pathway is possible, the one or more user devices 340 and 350 communicate with the sensors 320, the home automation controls 322, the camera 330, the thermostat 334, and the robotic devices 390 using the direct local pathway. If communication using the direct local pathway is not possible, the one or more user devices 340 and 350 communicate with the sensors 320, the home automation controls 322, the camera 330, the thermostat 334, and the robotic devices 390 using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The system 300 further includes a rain gutter power generator 395 in communication with the control unit 310 through a communication link 397, which similarly to as described above in regards to communication links 324, 326, 328, 332, 338, and 384, may be wired or wireless and include a local network. The rain gutter power generator 395 may be the generator 112, the control unit 310 may be the control unit 120, the thermostat 334 may be the thermostat 150, the sensors 320 and automation controls 322 may be the lights 140 and door lock 160, and the monitoring server 360 may be the weather server 170.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:
1. A system comprising:
a rain gutter of a property, wherein at least a portion of the rain gutter is positioned on a roof of the property;
a rain gutter power generator that is coupled to the rain gutter, wherein the rain gutter power generator includes:

a water turbine that transforms kinetic energy of water collected by the rain gutter of the property into mechanical energy; and an electromagnetic generator that transforms the mechanical energy into electricity that powers a device at the property; and a control unit that controls the device at the property, wherein the control unit stores instructions that are operable, when executed by the control unit, to cause the control unit to perform operations comprising:

determining an amount of rain forecasted at the property;

determining that power at the property is no longer available from a power station;

determining an amount of power available from a battery at the property;

selecting a set of devices at the property to power based on the amount of rain forecasted at the property and the amount of power available from the battery, the set of devices including the device at the property; and powering the set of devices that was selected with power from both the rain gutter power generator and the battery.

2. The system of claim 1, wherein the rain gutter power generator is coupled to a bottom of a downpipe portion of the rain gutter.

3. The system of claim 1, wherein the rain gutter power generator is positioned inside the rain gutter before the water flows into a downpipe portion of the rain gutter.

4. The system of claim 1, comprising:
a water reservoir on the roof of the property that collects the water and controls a flow of the water into the rain gutter.

5. The system of claim 1, wherein selecting a set of devices at the property to power based on the amount of rain forecasted at the property and the amount of power available from the battery comprises:

determining an amount of power the rain gutter power generator is likely to generate based on the amount of rain forecasted at the property; and selecting the set of devices at the property to power based on the amount of power the rain gutter power generator is likely to generate and the amount of power available from the battery.

6. The system of claim 5, wherein determining an amount of power the rain gutter power generator is likely to generate based on the amount of rain forecasted at the property comprises:

determining an amount of power the rain gutter power generator is likely to generate based on historical data regarding power generated by the rain gutter power generator.

7. The system of claim 1, wherein determining an amount of rain forecasted at the property comprises:

receiving a weather report from a weather server; and determining the amount of rain forecasted at the property from the weather report.

8. The system of claim 7, the operations further comprising:

receiving a second weather report from the weather server; and selecting a second set of devices at the property to power based on an amount of rain indicated in the second weather report and the amount of power available from the battery.

9. The system of claim 7, wherein selecting a set of devices at the property to power based on the amount of rain forecasted at the property and the amount of power available from the battery further comprises:

selecting the set of devices at the property to power based on the amount of rain forecasted at the property, the amount of power available from the battery, and an amount of water in a water reservoir on the roof of the property that collects the water and controls a flow of the water into the rain gutter.

10. The system of claim 1, the operations further comprising:

determining that the rain gutter is likely blocked based on the amount of rain forecasted at the property and an amount of power generated by the rain gutter power generator; and providing an indication to a user that the rain gutter is likely to be blocked.

11. The system of claim 1, wherein the device comprises one of a door lock, a light, a camera, a thermostat, or a HVAC system.

* * * * *